United States Patent
Zambon et al.

(10) Patent No.: US 6,797,794 B2
(45) Date of Patent: Sep. 28, 2004

(54) OLEFINS PRODUCED FROM PRE-POLYMERIZED CATALYST COMPONENT CATALYSTS

(75) Inventors: Licio Zambon, Milan (IT); Mario Sacchetti, Ferrara (IT); Gianni Vitale, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/202,524

(22) Filed: Jul. 24, 2002

(65) Prior Publication Data

US 2003/0050185 A1 Mar. 13, 2003

Related U.S. Application Data

(62) Division of application No. 09/509,657, filed as application No. PCT/EP99/05356 on Jul. 23, 1999, now Pat. No. 6,451,726.

(30) Foreign Application Priority Data

Aug. 3, 1998 (IT) .......................................... MI98A1823

(51) Int. Cl.$^7$ .............................................. C08F 110/06
(52) U.S. Cl. ........................ 526/351; 526/348; 526/113; 526/124.3; 526/158; 526/169.2; 526/908; 526/904; 502/103; 502/104; 502/117; 502/115
(58) Field of Search ................................. 526/348, 351, 526/113, 124.3, 158, 169.2, 908, 904; 502/103, 104, 117, 115

(56) References Cited

U.S. PATENT DOCUMENTS

| | | | |
|---|---|---|---|
| 4,399,054 A | 8/1983 | Ferraris et al. ............. 252/429 |
| 4,469,648 A | 9/1984 | Ferraris et al. ................. 264/9 |
| 5,173,540 A | * 12/1992 | Saito et al. .................. 525/247 |
| 5,352,749 A | 10/1994 | DeChellis et al. ............ 526/68 |
| 5,916,990 A | 6/1999 | Yanagihara et al. ........ 526/351 |
| 6,184,328 B1 | 2/2001 | Yanagihara et al. ........ 526/351 |
| 6,323,298 B1 | 11/2001 | Yanagihara et al. ........ 526/351 |

FOREIGN PATENT DOCUMENTS

| | | | |
|---|---|---|---|
| EP | 0089691 | 9/1983 | |
| EP | 0241947 | 10/1987 | |
| EP | 0395083 | 10/1990 | |
| EP | 0553805 | 8/1993 | |
| EP | 0553806 | 8/1993 | |
| EP | 0580102 | 1/1994 | ......... C08F/210/16 |
| EP | 0601525 | 6/1994 | |
| EP | 0604401 | 6/1994 | |
| EP | 0695313 | 2/1996 | |
| EP | 0728770 | 8/1996 | ........... C08F/10/00 |
| WO | 9200333 | 1/1992 | |
| WO | 9428032 | 12/1994 | |
| WO | 9526369 | 10/1995 | |
| WO | 9531490 | 11/1995 | ........... C08F/10/06 |
| WO | 9532995 | 12/1995 | |
| WO | 9844009 | 10/1998 | |

* cited by examiner

Primary Examiner—Ling-Siu Choi

(57) ABSTRACT

Olefin polymers produced using components of catalysts obtained by contacting a Ti compound of formula Ti(OR)$_{n-y}$X$_y$, where n is the valence of titanium and y is a number between 1 and n, with a pre-polymer having a porosity higher than 0.3 cc/g and containing from 0.5 to 100 g of polymer per g of solid catalyst component, the pre-polymer being obtained by (co)polymerizing an olefin or a diolefin in the presence of a catalyst comprising a Ti, V, Zr or Hf compound supported on a Mg dihalide having a mean crystallite dimension lower than 30 nm.

2 Claims, No Drawings

OLEFINS PRODUCED FROM PRE-POLYMERIZED CATALYST COMPONENT CATALYSTS

CROSS-REFERENCE TO RELATED APPLICATIONS

This application is a divisional of application Ser. No. 09/509,657, filed on Mar. 30, 2000, now U.S. Pat. No. 6,451,726 which is a national phase filing under 35 U.S.C. §371 of International Application No. PCT/EP99/05356 filed Jul. 23, 1999, which claims priority to Italian Application No. MI988A001823 filed Aug. 3, 1998. The entire contents of application Ser. No. 09/509,657, International Application No. PCT/EP99/05356 and Italian Application No. MI988A001823, each as filed, are incorporated herein by reference.

The present invention relates to components of catalysts for the polymerization of olefins $CH_2=CHR$, wherein R is hydrogen or a hydrocarbon radical having 1–12 carbon atoms, the catalysts obtained therefrom and their use in the polymerization of said olefins.

In particular, the catalyst components of the present invention are very suitable for the preparation of crystalline propylene (co)polymers by using gas-phase, slurry or bulk (co)polymerization processes.

Components of high-yield catalysts for the polymerization of olefins, and in particular for propylene, are known in the art. They are generally obtained by supporting, on a magnesium dihalide, a titanium compound and an electron donor compound as a selectivity control agent. Said catalyst components are then used together with an aluminum alkyl and, optionally, another electron donor (external) compound in the stereospecific polymerization of propylene. Depending on the type of electron donor used the stereoregularity of the polymer can vary. However, the stereospecific catalysts of interest should be able to give polypropylene (co)polymers having isotactic index, expressed in terms of xylene insolubility, of higher than 90%.

Said catalyst components, and the catalysts obtained therefrom, are largely used in the plants for the (co)polymerization of propylene both operating in liquid phase (slurry or bulk) and in gas-phase. However, the use of the catalyst components as such is not completely satisfactory. Indeed, problems such as formation of polymers with irregular morphology and in particular of fines and low bulk density are experienced when plants operate with catalyst components as such.

In order to solve these problems, the catalyst components are often pre-polymerized under controlled conditions, so as to obtain pre-polymerized catalysts having good morphology. After pre-polymerization, the catalysts also increase their resistance in such a way that the tendency to break under polymerization conditions is decreased. As a consequence, the formation of fines is reduced and the main polymerization process, either in slurry or gas-phase, can be carried out smoothly and with the production of final polymers having high bulk density.

However, one of the possible drawbacks associated with this method is the lowering of the activity expressed as amount of polymer obtained per g of catalyst fed. In other words, even if the activity of the catalyst in itself (expressed in respect of the magnesium chloride contained in the catalyst) could remain at the same level, the activity in respect of the pre-polymer/catalyst system is lower due to the effect of the dilution of the catalyst within the pre-polymer. Depending on the degree of pre-polymerization, the loss in activity can also be substantial. This means that a large amount of pre-polymer/catalyst system must be fed to the reactor in order to obtain acceptable yields. It would be therefore important to have a pre-polymerized catalyst component in which this drawback is absent or minimized.

In the international patent application WO95/26369 the pre-polymer obtained by pre-polymerization of a catalyst component comprising a Ti compound supported on magnesium dihalide, is contacted with a metallocene compound in particular selected from the class of zirconocenes. The resulting catalyst shows a good activity with respect to magnesium chloride therein contained but the yield is rather low if referred to the pre-polymer/catalyst system. In any case, the catalyst obtained after treatment with the metallocene compound is different in nature from the original conventional Ziegler-Natta catalyst so that also the polymers obtained show the typical features associated with the use of metallocene catalysts such as a very narrow Molecular Weight Distribution. As a consequence, the polymerization results showed in the above-cited patent application do not provide any useful teaching about the possible activity of the original catalyst system contained in the pre-polymer.

The European patent application EP-A-604401 proposes the solution of pre-polymerizing a catalyst component, comprising a titanium compound and an electron donor compound supported on a magnesium dihalide, first with a linear olefin and then with a non linear olefin in order to produce a linear olefin/non linear olefin copolymer as a pre-polymer. The so obtained pre-polymer/catalyst system is further contacted with a Ti compound, in particular $TiCl_4$, and optionally also with an electron donor compound in order to obtain a final catalyst component. The pre-polymer/catalyst system obtained however, does not solve the problem because the decrease of the activity observed in the polymerization examples if the activity is calculated as Kg of polymer produced per g of pre-polymer/catalyst fed, is always proportional to the dilution of the catalyst component in the pre-polymer. In other words, when the amount of pre-polymer is about 50% of the total pre-polymer/catalyst system (see Table 2 of EP604401), the activity in the polymerization test is about a half of the activity of the non pre-polymerized catalyst. This means that, according to the disclosure of EP604401, the pre-polymerization step and the further titanation treatment did not improve the activity of the catalyst in itself.

It has now unexpectedly been found a catalyst component having improved activity which is the product obtained by contacting a Ti compound of formula $Ti(OR)_{n-y}X_y$, where R is an alkyl, isoalkyl, cycloalkyl or aryl radical having from 1 to 18 carbon atoms, preferably an alkyl, isoalkyl or cycloalkyl radical having from 1 to 8 carbon atoms, more preferably n-butyl or isopropyl, X is a halogen atom, preferably a chlorine or bromine atom, n is the valence of titanium and y is a number of from 1 to n, with a pre-polymer having a porosity (measured with Hg method) higher than 0.3 cc/g and containing from 0.5 to 100 g of polymer per g of solid catalyst component, said pre-polymer being obtained by (co)polymerizing an olefin or a diolefin which is (co)polymerizable in the presence of a catalyst comprising a solid component comprising a transition metal compound selected from the group consisting of Ti compounds of the above formula $Ti(OR)_{n-y}X_y$, vanadium halides, haloalcoholates and vanadyl halides, Ti, Zr and Hf compounds containing at least a π-metal bond, said transition metal compound being supported on a Mg dihalide having a mean crystallite size lower than 30 nm.

The porosity of the pre-polymer is preferably higher than 0.4 cc/g and still more preferably higher than 0.5 cc/g. In the present application the term (Hg) porosity referred to the pre-polymer means the porosity measured by the mercury porosimetry method described below and due to pores with radius up to 75,000 Å.

The amount of pre-polymer ranges preferably from 1 to 50 and preferably from 2 to 30 g of polymer per g of solid catalyst component used to prepare it.

The term "pre-polymer" used hereabove and hereinafter means a polymer prepared under conditions such as to have a weight ratio polymer/solid catalyst component equal to, or lower than 100; the catalyst used to prepare the pre-polymer being capable to give, under the propylene or ethylene general polymerization conditions given below, a yield higher than 1 Kg/g solid catalyst component.

The magnesium halides, preferably $MgCl_2$, in active form used as a support for Ziegler-Natta catalysts, are well known. The active magnesium halides are those having a mean crystallite size, determined by X-ray diffractometry, lower than 30 nm and particularly preferred are those in which the mean crystallite size is lower than 15 nm. Particularly preferred magnesium chlorides are those characterized by X-ray spectra in which the most intense diffraction line that appears in the spectrum of the non-active chloride is diminished in intensity and is replaced by a halo whose maximum intensity is shifted towards lower angles relative to that of the more intense line.

The preparation of the solid catalyst component used to prepare the pre-polymer can be carried out according to several methods. Preferred methods are those producing catalyst components which, due to their particular physical properties are able to directly produce porous pre-polymers during the pre-polymerization step. In one of the preferred methods the solid catalyst component is prepared by reacting a titanium compound of the general formula $Ti(OR)_{n-y}X_y$ as above specified, preferably $TiCl_4$, with an adduct of formula $MgCl_2 \cdot pROH$, where p is a number of from 0.1 to 6 and R is a hydrocarbon radical, suitably an alkyl, isoalkyl or cycloalkyl radical, having from 1 to 18, preferably from 1 to 8, more preferably from 1 to 4, carbon atoms. The adduct can be suitably prepared in spherical form by mixing an alcohol of the above formula ROH and magnesium chloride in the presence of an inert hydrocarbon immiscible with the adduct, operating under stirring conditions at the melting temperature of the adduct. Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80–130° C.) so as to obtain an adduct in which the number of moles of alcohol is generally lower than 3 preferably between 0.1 and 2.5. The reaction with the Ti compound can be carried out for example by suspending the adduct (dealcoholated or as such) in cold $TiCl_4$ (generally 0° C.); the mixture is heated up to 80–130° C. and kept at this temperature for 0.5–2 hours. The treatment with $TiCl_4$ can be carried out one or more times. When a stereospecific catalyst is to be prepared, an internal electron donor compound is added during the treatment with $TiCl_4$. The treatment with the electron donor compound can be repeated one or more times.

The preparation of catalyst components in spherical form according to the above general procedure is described for example in U.S. Pat. No. 4,399,054, EP-A-395083, EP-A-553805, W098/44001.

According to another embodiment, the $MgCl_2 \cdot pROH$ adduct is first thermally dealcoholated according the procedure described above and successively contacted with reactive compounds capable of removing the alcohol. Suitable reactive compounds are, for example, Al-alkyl compounds or $SiCl_4$. The so obtained adduct is then reacted with a titanium compound in order to obtain the final solid catalyst component. The preparation of catalyst components in spherical form according to this procedure is described for example in EP-A-553806, and EP-A-601525.

In general, the solid catalyst components obtained according to the methods described above show a surface area (by B.E.T. method) between 20 and 500 $m^2/g$ and preferably between 50 and 400 $m^2/g$, and more preferably between 100 and 400 $m^2/g$; a total porosity (by B.E.T. method) higher than 0.2 $cm^3/g$ preferably between 0.2 and 0.6 $cm^3/g$ and more preferably from 0.3 to 0.5 $cm^3/g$. The porosity (Hg method) due to pores with radius up to 10,000 Å generally ranges from 0.3 to 1.5 $cm^3/g$, preferably from 0.45 to 1 $cm^3/g$.

As explained above, when a stereospecific catalyst is desired, an electron donor compound is used in the preparation of the solid catalyst component. The so-called internal electron-donor compound may be selected from esters, ethers, amines and ketones. It is preferably selected from alkyl, cycloalkyl or aryl esters of monocarboxylic acids, for example benzoic acid, or polycarboxylic acids, for example phthalic or malonic acid, the said alkyl, cycloalkyl or aryl groups having from 1 to 18 carbon atoms. Examples of preferred electron-donor compounds are methyl benzoate, ethyl benzoate, diisobutyl phthalate, di-n-hexyl phthalate, di-octyl phthalate, di-neopentyl phthalate. Furthermore, the electron donor compound can be suitably selected from 1,3-diethers of formula (1)

where $R^I$ and $R^{II}$ are the same or different and are hydrogen or linear or branched $C_1$–$C_{18}$

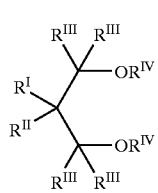

(I)

hydrocarbon groups which can also form one or more cyclic structures; $R^{III}$ groups, equal or different from each other, are hydrogen or $C_1$–$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1–6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include:

2-(2-ethylhexyl)1,3-dimethoxypropane,
2-isopropyl-1,3-dimethoxypropane,
2-butyl-1,3-dimethoxypropane,
2-sec-butyl-1,3-dimethoxypropane,
2-cyclohexyl-1,3-dimethoxypropane,
2-phenyl-1,3-dimethoxypropane,
2-tert-butyl-1,3-dimethoxypropane,
2-cumyl-1,3-dimethoxypropane,
2-(2-phenylethyl)-1,3-dimethoxypropane,
2-(2-cyclohexylethyl)-1,3-dimethoxypropane,
2-(p-chlorophenyl)-1,3-dimethoxypropane,
2-(diphenylmethyl)-1,3-dimethoxypropane,
2(1-naphthyl)-1,3-dimethoxypropane,
2(p-fluorophenyl)-1,3-dimethoxypropane,
2(1-decahydronaphthyl)-1,3-dimethoxypropane,
2(p-tert-butylphenyl)-1,3-dimethoxypropane,
2,2-dicyclohexyl-1,3-dimethoxypropane,
2,2-diethyl-1,3-dimethoxypropane,
2,2-dipropyl-1,3-dimethoxypropane,
2,2-dibutyl-1,3-dimethoxypropane,
2,2-diethyl-1,3-diethoxypropane,
2,2-dicyclopentyl-1,3-dimethoxypropane,
2,2-dipropyl-1,3-diethoxypropane,
2,2-dibutyl-1,3-diethoxypropane,
2-methyl-2-ethyl-1,3-dimethoxypropane,
2-methyl-2-propyl-1,3-dimethoxypropane,
2-methyl-2-benzyl-1,3-dimethoxypropane,
2-methyl-2-phenyl-1,3-dimethoxypropane,
2-methyl-2-cyclohexyl-1,3-dimethoxypropane,
2-methyl-2-methylcyclohexyl-1,3-dimethoxypropane,
2,2-bis(p-chlorophenyl)-1,3-dimethoxypropane,
2,2-bis(2-phenylethyl)-1,3-dimethoxypropane,
2,2-bis(2-cyclohexylethyl)-1,3-dimethoxypropane,
2-methyl-2-isobutyl-1,3-dimethoxypropane,
2-methyl-2-(2-ethylhexyl)-1,3-dimethoxypropane,
2,2-bis(2-ethylhexyl)-1,3-dimethoxypropane,
2,2-bis(p-methylphenyl)-1,3-dimethoxypropane,
2-methyl-2-isopropyl-1,3-dimethoxypropane,
2,2-diisobutyl-1,3-dimethoxypropane,
2,2-diphenyl-1,3-dimethoxypropane,
2,2-dibenzyl-1,3-dimethoxypropane,
2-isopropyl-2-cyclopentyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2-isobutyl-2-isopropyl-1,3-dimetoxypropane,
2,2-di-sec-butyl-1,3-dimetoxypropane,
2,2-di-tert-butyl-1,3-dimethoxypropane,
2,2-dineopentyl-1,3-dimethoxypropane,
2-iso-propyl-2-isopentyl-1,3-dimethoxypropane,
2-phenyl-2-benzyl-1,3-dimetoxypropane,
2-cyclohexyl-2-cyclohexylmethyl-1,3-dimethoxypropane.

Particularly preferred are the 1,3-diethers of formula (II)

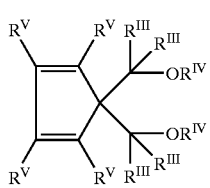

(II)

where the radicals $R^{III}$ and $R^{IV}$ have the same meaning explained above and the radicals $R^V$, equal or different to each other, are selected from the group consisting of hydrogen; halogens, preferably Cl and F; $C_1$–$C_{20}$ alkyl radicals, linear or branched; $C_3$–$C_{20}$ cycloalkyl, $C_6$–$C_{20}$ aryl, $C_7$–$C_{20}$ alkaryl and $C_7$–$C_{20}$ aralkyl radicals and two or more of the $R^V$ radicals can be bonded to each other to form condensed cyclic structures, saturated or unsaturated, optionally substituted with $R^{VI}$ radicals selected from the group consisting of halogens, preferably Cl and F; $C_1$–$C_{20}$ alkyl radicals, linear or branched; $C_3$–$C_{20}$ cycloalkyl, $C_6$–$C_{20}$ aryl, $C_7$–$C_{20}$ alkaryl and $C_7$–$C_{20}$ aralkyl radicals; said radicals $R^V$ and $R^{VI}$ optionally containing one or more heteroatoms as substitutes for carbon or hydrogen atoms, or both.

Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Specially preferred are the compounds of formula (III):

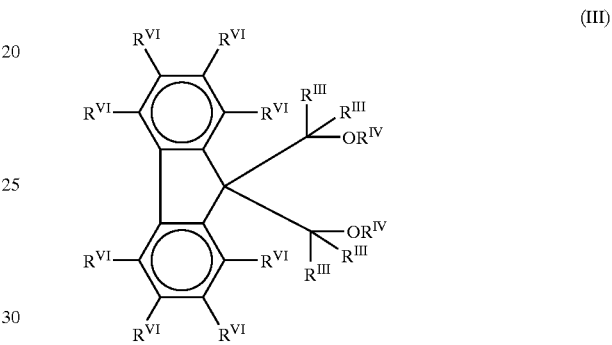

(III)

where the $R^{VI}$ radicals equal or different are hydrogen; halogens, preferably Cl and F; $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (II). Specific examples of compounds comprised in formulae (II) and (III) are:

1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene;
1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;

1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.
9,9-bis(methoxymethyl)fluorene being the most preferred.

Most preferred internal electron donors for use in the preparation of the catalyst components of the present invention are the esters of phthalic acid and the above described 1,3 diethers.

In the preparation methods described above, the internal electron donor compound can be added as such or, in an alternative way, it can be obtained in situ by using an appropriate precursor capable to be transformed in the desired electron donor compound by means, for example, of known chemical reactions such as esterification or transesterification. Generally, the internal electron donor compound is added in molar ratio with respect to the $MgCl_2$ of from 0.01 to 1 preferably from 0.05 to 0.5.

The solid catalyst components used to prepare the pre-polymer can also be prepared according to the disclosure of WO 95/32995 in which a Ti, Zr or Hf metallocene compound is supported on a $MgCl_2$ having surface area higher than 100 $m^2/g$ and porosity (BET) higher than 0.2 $cm^3/g$.

As explained above, the original solid catalyst component is then pre-polymerized with one or more olefins or diolefins to obtain the porous pre-polymer. Generally, the pre-polymer has the same nature as the final polymer to be produced but, if deemed it advisable, the pre-polymer can also have a different nature with respect to the final polymer. This can be the case for example when the pre-polymer has to work as a nucleating agent which is homogeneously dispersed within the final product.

Suitable olefins to be prepolymerized are those of formula $CH_2=CHR$, wherein R is hydrogen or a C1–C12 alkyl group or an aryl radical. Preferably, the olefin is selected from ethylene, propylene, butene-1, hexene-1, and 4-methyl-1-pentene. Ethylene and propylene are especially preferred.

Preferably, the pre-polymer is prepared under conditions such as to obtain a crystalline polymer, and in particular, polymers having a high content of crystallinity. In the case of the pre-polymerization of propylene for example, the preferred polypropylenes are those having a crystallinity such that the fusion enthalpy, measured by DSC method is higher than 70 J/g. The pre-polymerization is generally carried out in the presence of an alkyl-aluminum compound. The alkyl-Al compound (B) is preferably chosen among the trialkyl aluminum compounds such as for example triethylaluminum (TEAL), triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$. It is further possible to use an metallo-alkyl compound different from an alkyl-Al compound, such as zinc di-alkyl compound capable of promoting olefin polymerization when used together with a Ti compound containing Ti-halogen bonds.

When the catalyst components comprise a metallocene compound supported on Mg dihalide, the Al-alkyl is suitably selected from alumoxanes containing the repeating unit —($R^1$)—Al—O— in which $R^1$, equal or different to each other are hydrocarbon groups having from 1 to 20 carbon atoms The amount of Al-alkyl compound generally used is such as to have an Al/Ti molar ratio of from 1 to 50. In the present invention it has been found particularly advantageous to carry out said pre-polymerization using lower amounts of alkyl-Al compound. In particular, said amount can be as low as to have an Al/Ti molar ratio of from 0.01 to 10 and more preferably of from 0.05 to 5.

During the pre-polymerization step, the presence of an external donor is not strictly necessary. However, it can be used in amounts such as to give Al/donor molar ratios ranging from 0.1 to 300 and preferably from 1 to 50. The external electron donor compound can be the same as, or different from, the internal donor described above. Suitable external electron donor compounds include silicon compounds, ethers, esters, amines, heterocyclic compounds and particularly 2,2,6,6-tetramethyl piperidine, ketones and the 1,3-diethers of the general formula (I) given above.

A class of preferred external donor compounds, to be used in particular when the internal donor is a phthalate, is that of silicon compounds of formula $R^5{}_aR^6{}_bSi(OR^7)_c$, where a and b are integers of from 0 to 2, c is an integer of from 1 to 3 and the sum (a+b+c) is 4; $R^5$, $R^6$, and $R^7$, are alkyl, cycloalkyl or aryl radicals with 1–18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3–10 carbon atoms optionally containing heteroatoms and $R^7$ is a $C_1$–$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane.

In particular when esters of monocarboxylic acids, for example benzoates, are used as internal donors also the external donor compound is selected from this class, p-ethoxy-ethyl benzoate being the most preferred. In addition, a mixture of this donor with another one, and in particular one selected from the class of silicon compounds, can be used. In this case ethylcyclohexyldimethoxysilane and dicyclopentyldimethoxysilane are most preferred.

The pre-polymerization can be carried out in liquid phase, (slurry or solution) or in gas-phase at temperatures generally lower than 80° C., preferably in the range between –20 and 60° C. Furthermore, it is preferably carried out in a liquid diluent in particular selected from liquid hydrocarbons. Among them, pentane, hexane and heptane are preferred.

The catalyst component of the present invention is then obtained by contacting the pre-polymer prepared according to the above procedure with the Ti compound as previously defined.

The Ti compound is preferably liquid under normal conditions, i.e. room temperature and atmospheric pressure. When the Ti compound is a solid, it is used in solution in a suitable solvent which is inert towards the pre-polymer and towards the catalyst components contained therein and which can be removed from the Ti compound by heating and/or chemical reaction with compounds such as $SiCl_4$ or Al-alkyl compounds.

Preferably, the Ti compound is selected from the group consisting of halides and, among them, the use of $TiCl_4$ is especially preferred.

The contact of the pre-polymer with the Ti compound is carried out under conditions suitable to fix at least 0.05% of Ti compound, expressed as Ti, on the pre-polymerized catalyst component. A Ti compound is considered fixed on the pre-polymerized catalyst component when it is not extractable to an extent higher than 50% with heptane at 80° C. for 2 hours.

The amount of Ti compound fixed on the pre-polymerized catalyst component by effect of the contact stage is generally higher than 0.05%, preferably higher than 0.2%, expressed as Ti.

In particular, when a Ti-based catalyst component is used to prepare the pre-polymer, the total amount of Ti compound (expressed as Ti) after the contact stage is from 0.1 to 5% preferably from 0.15 to 3% and more preferably from 0.2 to 2,5%.

In this case, particularly advantageous are the catalyst components containing Mg dichloride in amount of 50 to 50,000 ppm. expressed as Mg, and in which the total amount of Ti compound fixed on the pre-polymerized catalyst component is such as to have a Ti/Mg weight ratio of from 0.01 to 3 and preferably from 0.1 to 2.5.

According to one of the preferred methods the pre-polymer is reacted with an excess of neat $TiCl_4$ at a temperature between 40 and 120°, preferably from 60 and 90° C. for a period of time ranging from 0.2 to 2 h. At the end of the treatment the excess of $TiCl_4$ is removed by siphoning or filtration of the solid component. Preferably, the reaction with $TiCl_4$ is carried out two or more times. Moreover, it is especially preferred carrying out said reaction in the presence of an electron donor compound dissolved in the $TiCl_4$. Preferably, the electron donor compound is selected from the groups disclosed above as suitable internal electron donor compounds.

According to another method the reaction is carried out with $TiCl_4$ diluted in a suitable hydrocarbon compound such as pentane, hexane, heptane, toluene. Also in this case the use of an internal electron donor compound is preferred.

After the contact stage with the Ti compound is completed the pre-polymerized catalyst component is suitably washed with solvents, in order to remove compounds not fixed on it. The washings are generally carried out at temperatures comprised between the room temperature and the boiling point of the solvent used. Suitable solvents to be used include liquid hydrocarbons such as hexane, heptane, toluene and halogenated hydrocarbons such as $CH_2Cl_2$.

The thus obtained pre-polymerized catalyst components allow to obtain highly active catalysts. In particular, when used in the polymerization of propylene, allow to obtain polymers with high stereoregularity, high bulk density and very good morphology thus showing their particular suitability for the liquid (bulk or slurry) and gas-phase processes. In particular, the pre-polymerized catalyst components of the invention show activities referred to the Mg that are remarkably improved with respect to those of the original solid component used to prepare the pre-polymer. Also, the yields referred to the pre-polymer/catalyst system are higher than the yields of the pre-polymer catalyst/system not treated with the Ti compound.

In view of these peculiarities, the catalyst components of the invention are particularly suitable for the use in liquid or gas-phase olefin polymerization plants operating without a pre-polymerization line.

In particular, said olefin polymerization processes are be carried out in the presence of a catalyst comprising (A) the pre-polymerized catalyst component described above; (B) a suitable cocatalyst, particularly an Al-alkyl compound, and optionally (C) one or more electron donor (external) compounds.

These latter can be selected from the groups of compounds that have been disclosed above as suitable external electron compounds and according to the guidance already described.

In the main polymerization step the electron donor compound (C) is used in such an amount to give a molar ratio between the organoaluminum compound and said electron donor compound of from 0.1 to 500, preferably from 1 to 300 and more preferably from 2 to 100. The Al/Ti ratio is preferably higher than 10.

The Al-alkyl compounds are preferably selected from those of formula $R_zAlX_{3-z}$ in which R is a $C_1$–$C_{20}$ hydrocarbon group, particularly an alkyl, isoalkyl, cycloalkyl or aryl radical, z is 2 or 3 and X is an halogen atom, preferably chlorine. Particularly preferred is the use of the trialkyl aluminum compounds such as for example triethylaluminum (TEAL), triisobutylaluninum, tri-n-butylaluminum, tri-n-hexylaluminum, tri-n-octylaluminum and tris(2,4,4-trimethyl-pentyl)aluminum. It is also possible to use mixtures of trialkylaluminum compounds with alkylaluminum halides, alkylaluminum hydrides or alkylaluminum sesquichlorides, such as $AlEt_2Cl$ and $Al_2Et_3Cl_3$.

Another class of compounds suitable as catalyst components to prepare the pre-polymer is that of the metallocene compounds having at least one M—R link in which M is Ti, Zr, or Hf and R is an alkyl radical. Said metallocene compounds are used in amounts such as to be in an equimolar ratio or in excess with respect to the metal compound present in the catalyst component. Preferably, said ratio ranges from 2:1 to 30:1. In case an equimolar amount of cocatalyst is used it is preferred adding a scavenger compound to the system selected from Al, Mg or Zn alkyl compounds that are not able to promote olefin polymerization when employed together with compounds containing Ti-halogen bonds. Examples of these compounds are Zn diethyl, Mg diethyl and $AlEt_3$ complexed with ethers or electron donor compounds not containing active hydrogen atoms.

Suitable metallocene compounds having at least one M—R link are generally those comprising two cyclopentadienyl rings, coordinated with the metal, which can be substituted and/or bridged and possibly condensed with other rings. Representative compounds are specifically mentioned and described in WO95/26369 the relevant part of which is herein included by reference.

In case the catalyst components comprise a metallocene compound, it is advisable to use, alone or in combination with another Al-alkyl compound, an alumoxane selected from those containing the repeating unit —($R^1$)—Al—O— in which $R^1$, equal or different to each other are hydrocarbon groups having from 1 to 20 carbon atoms. The use of methylalumoxane is preferred. In addition, it is also possible to use compounds of the formula $Y^+Z^-$, where $Y^+$ is a Brönsted acid capable of donating a proton and irreversibly reacting with a substituent of the metallocene compound, and $Z^-$ is a compatible not coordinating anion which is capable of stabilizing the active catalytic species resulting from the reaction of the two compounds and which is sufficiently labile to be displaced by an olefinic substrate. Preferably, the anion $Z^-$ consists of one or more boron atoms. More preferably, the anion $Z^-$ is an anion of the formula $BAr_4^-$, where the substituents Ar which can be identical or different are aryl radicals such as phenyl, pentafluorophenyl or bis(trifluoro-methyl)phenyl. Tetrakis-pentafluorophenyl borate is particularly preferred. Moreover, compounds of the formula $BAr_3$ can conveniently be used. Compounds of this type are described for example, in the International patent application WO92/00333.

The above described polymerization process can be carried out under the polymerization conditions generally known in the art. Accordingly, the polymerization is generally carried out at a temperature of from 20 to 120° C., preferably of from 40 to 80° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa.

In any of the polymerization processes used (liquid or gas-phase polymerization) the catalyst forming components (A), (B) and optionally (C), can be pre-contacted before adding them to the polymerization reactor. Said pre-contacting step can be carried out in the absence of polymerizable olefin or optionally in the presence of said olefin in an amount up to 3 g per g of solid catalyst component. The catalyst forming components can be contacted with a liquid inert hydrocarbon solvent such as propane, n-hexane, or n-heptane at a temperature below about 60° C. and preferably from about 0° C. to 30° C. for a time period of from 10 seconds to 60 minutes.

When a gas-phase polymerization process is used, it can be carried out according to known techniques operating in ore or more reactors having a fluidized or mechanically agitated bed. Inert fluids such as nitrogen, or low hydrocarbons like propane, can be used both as a fluidization aid and in order to improve the thermal exchange within the reactors. In addition, also techniques increasing the removal of the reaction heat comprising the introduction of liquids, optionally in mixture with gas, into the reactors, can be used. Preferably the liquids are fresh or make-up monomers. Such techniques are disclosed for example in EP-A-89691, EP-A-241947, U.S. Pat. No. 5,352,749, WO94/28032 and EPA-695313.

Among the olefin polymers obtainable by the process of the invention, particularly interesting are the propylene (co)polymers having a heat of fusion ($\Delta Hf$) higher than 70 J/g measured by D.S.C. method.

The following examples are given in order better illustrate the invention without limiting it.

EXAMPLES

Characterization

Crystallite Dimension

Determined by measuring the breadth at half-height of the (110) reflection appearing in the spectrum of the magnesium halide applying the Sherrer's equation $D(110)=(K \cdot 1.542 \cdot 57.3)/(B-b)\cos\theta$ where:

K=constant (1.83 in the case of Mg chloride)
B=breadth at half-height;
B=instrumental broadening;
$\cos\theta$=Bragg angle.

The X-ray diffraction spectrum of the catalyst component is carried out with a diffractometer using the $CuK_\alpha(\lambda=1,5418$ Å) radiation, set with a 0.2 mm receiving slit and recording conditions such as to give a number of counts associated with the (110) reflection of 1000 or higher; said spectrum being carried out and without adding any standard to the sample.

Determination of X.I.

2.5 g of polymer were dissolved in 250 ml of o-xylene under stirring at 135EC for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I. %.

General Procedure for the Standard Propylene Polymerization Test

A 4-liter steel autoclave equipped with a stirrer, pressure gauge, thermometer, catalyst-feeding system, monomer feeding lines and thermostatting jacket, was used. The reactor was charged with 0.01 g of solid catalyst component and with TEAL, and cyclohexyl-methyl dimethoxy silane in such amounts to give an Al/Donor molar ratio of 20. Moreover, 3.21 of propylene, and 1L of hydrogen were added. The system was heated to 70° C. over 10 min. under stirring, and maintained under these conditions for 120 min. At the end of the polymerization, the polymer was recovered by removing any unreacted monomers and was dried under vacuum.

General Procedure for the Standard Ethylene Polymerization (HDPE)

Into a 4 liters stainless steel autoclave, degassed under $N_2$ stream at 70° C., 1600 cc of anhydrous hexane, 0.02 g of spherical component and 0.3 g of triisobutylaluminum (Tiba) were introduced. The whole was stirred, heated to 75° C. and thereafter 4 bar of $H_2$ and 7 bar of ethylene were fed. The polymerization lasted 2 hours during which ethylene was fed to keep the pressure constant. At the end of the polymerization, the polymer was recovered by removing any unreacted monomers and was dried under vacuum.

Porosity (Due to Pores with Radius up to 75,000 Å):

The measure is carried out using a "Porosimeter 2000 series" by Carlo Erba.

The porosity is determined by absorption of mercury under pressure. For this determination use is made of a calibrated dilatometer (diameter 3 mm) $CD_3$ (Carlo Erba) connected to a reservoir of mercury and to a high-vacuum pump ($1 \cdot 10^{-2}$ mbar). A weighed amount of sample is placed in the dilatometer. The apparatus is then placed under high vacuum (<0.1 mm Hg) and is maintained in these conditions for 10 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm². Under the effect of the pressure, the mercury enters the pores and the level goes down according to the porosity of the material.

The porosity (cm³/g), and the distribution of pores is directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

Determination of Melt Index
ASTM D 1238 condition "L"

EXAMPLES

Example 1

Preparation of Solid Catalyst Component (Example 1A)

10.0 g of microspheroidal $MgCl_2 \cdot 2.8C_2H_5OH$ (prepared according to the method described in ex.2 of U.S. Pat. No. 4,399,054 but operating at 3,000 rpm instead of 10,000) were subject to thermal dealcoholation carried out at increasing temperatures from 30 to 95° C. and operating in nitrogen current until a molar ratio $EtOH/MgCl_2$ of about 1 was obtained.

The so obtained adduct was poured into a 500 ml four-necked round flask, purged with nitrogen, which contained 250 ml of $TiCl_4$ introduced at 0° C. The flask was heated to 40° C. and 6 mmoles of diisobutylphthalate (DIBP) were thereupon added. The temperature was raised to 100° C. and maintained for two hours, then the stirring was discontinued, the solid product was allowed to settle and the supernatant liquid was siphoned off.

The treatment with $TiCl_4$ was repeated and the solid obtained was washed six times with anhydrous hexane (6×100 ml) at 60° C. and then dried under vacuum. A catalyst component having a surface area (measured by BET) of 130 $m^2/g$ and a porosity (Hg due to pores with radius up to 10,000 Å) of 0.72 was obtained. The chemical characteristics of the solid, the results of the propylene polymerization test and that of the ethylene polymerization test are reported in Table 1.

Propylene Pre-Polymerization (Example 1B)

The catalyst component prepared according to the above procedure was pre-polymerized with propylene to give a weight ratio pre-polymer/solid catalyst component of 10 g/g. The pre-polymerization was carried out in hexane in the presence of TEAL (weight ratio TEAL/solid catalyst component=0.05) and cyclohexyl-methyl-dimethoxy silane as external donor (molar ratio TEAL/Donor of 20). The so obtained pre-polymer catalyst system, having a porosity (Hg due to pores with radius up to 75,000 Å) of 0.56 $cm^3/g$ was subject to the propylene polymerization procedure the results of which are reported in Table 1.

Treatment Stage with the Ti Compound

The above prepared pre-polymer was suspended in $TiCl_4$ using amounts of reactants such as to give a 50 g/l suspension. The temperature was then raised at 80° C. and the system was kept under these conditions, with stirring, for 1 hour. After that time stirring was discontinued the liquid siphoned off and the solid obtained was washed with hexane. The chemical characteristics of the solid, the results of the propylene polymerization test and that of the ethylene polymerization test are reported in Table 1.

Example 2

The pre-polymer prepared according to the procedure of example 1, was suspended in liquid $TiCl_4$ also containing DIBP. The amounts of reactants were such as to give a concentration of pre-polymer in $TiCl_4$ of 50 g/l and weight ratio DIBP/pre-polymer of 12%. The temperature was then raised at 80° C. and the system was kept under these conditions, with stirring, for 1 hour. After that time stirring was discontinued the liquid siphoned off. A further stage of contacting with $TiCl_4$, without DIBP, under the same conditions was performed at the end of which the solid was washed with hexane at 60° C. The chemical characteristics of the solid, the results of the propylene polymerization test and that of the ethylene polymerization test are reported in Table 1.

Example 3

The pre-polymer prepared according to the procedure of example 1, was suspended in liquid medium containing heptane and $TiCl_4$ in a 1:1 volume ratio and also containing 9,9-bis(methoxymethyl)fluorene. The amounts of reactants were such as to give a concentration of pre-polymer in the liquid phase of 50 g/l and a weight ratio 9,9-bis (methoxymethyl)fluorene/pre-polymer of 5%. The temperature was then raised at 80° C. and the system was kept under these conditions, with stirring, for 1 hour. After that time stirring was discontinued the liquid siphoned off. A further stage of contacting with pure $TiCl_4$ without 9,9-bis (methoxymethyl)fluorene, under the same conditions as those disclosed in example 1 was performed at the end of the solid was washed with hexane. The chemical characteristics of the solid, the results of the propylene polymerization test and that of the ethylene polymerization test are reported in Table 1.

Example 4

The same pre-polymerization procedure disclosed in Example 1 was repeated with the only difference that the pre-polymerization was prolonged up to obtaining a final weight ratio pre-polymer/catalyst of 15 g/g.

Treatment Stage with the Ti Compound

The treatment was carried out according to the procedure disclosed in example 1. The chemical characteristics of the solid, the results of the propylene polymerization test and that of the ethylene polymerization test are reported in Table 1.

Example 5

Ethylene Pre-Polymerization

The catalyst component prepared according to the procedure disclosed in Example 1 was pre-polymerized with ethylene to give a weight ratio pre-polymer/catalyst of 11.6 g/g. The pre-polymerization was carried out in hexane using TEAL as cocatalyst (weight ratio TEAL/solid catalyst component=0.05). The so obtained pre-polymer catalyst system, having a porosity (Hg due to pores with radius up to 75,000 Å) of 0.6 $cm^3/g$ was subject to the propylene polymerization procedure and to the ethylene polymerization procedure the results of which are reported in Table 1.

Treatment Stage with the Ti Compound

The obtained ethylene pre-polymer, was suspended in liquid medium containing heptane and $TiCl_4$ in a 1:1 volume. The amounts of reactants were such as to give a concentration of pre-polymer in the liquid phase of 50 g/l. The temperature was then raised at 80° C. and the system was kept under these conditions, with stirring, for 1 hour. After that time stirring was discontinued the liquid siphoned off and the solid washed with hexane at 60° C. The chemical characteristics of the solid, the results of the propylene polymerization test are reported in Table 1.

Example 6

Treatment Stage with the Ti Compound

The ethylene pre-polymer according to example 5 was suspended in liquid medium containing heptane/$TiCl_4$ in a 1:1 volume ratio and also containing 9,9-bis (methoxymethyl)fluorene. The amounts of reactants were such as to give a concentration of pre-polymer in the liquid phase of 50 g/l and a weight ratio 9,9-bis(methoxymethyl) fluorene/pre-polymer of 5%. The temperature was then raised at 80° C. and the system was kept under these conditions, with stirring, for 1 hour. After that time stirring was discontinued the liquid siphoned off and a further treatment with $TiCl_4$, without 9,9-bis(methoxymethyl) fluorene was carried out. At the end the solid was washed with hexane and then dried. The chemical characteristics of the solid, the results of the propylene polymerization test and that of the ethylene polymerization test are reported in Table 1.

Example 7
Ethylene Pre-Polymerization

The catalyst component prepared according to the procedure disclosed in Example 1 was pre-polymerized with ethylene to give a weight ratio pre-polymer/catalyst of 30 g/g. The pre-polymerization was carried out in hexane using TEAL as cocatalyst (weight ratio TEAL/solid catalyst component=0.5). The so obtained pre-polymer catalyst system, having a porosity (Hg due to pores with radius up to 75,000 Å) of 0.6 cm$^3$/g was subject to the propylene polymerization procedure the results of which are reported in Table 1.

Treatment Stage with the Ti Compound

The ethylene pre-polymer according to Example 5 was suspended in liquid medium containing heptane/$TiCl_4$ in a 1:1 volume ratio and also containing DIBP. The amounts of reactants were such as to give a concentration of pre-polymer in the liquid phase of 50 g/l and a weight ratio DIBP/pre-polymer of 5%. The temperature was then raised at 80° C. and the system was kept under these conditions, with stirring, for 1 hour. After that time stirring was discontinued the liquid siphoned off and a further treatment with $TiCl_4$, without DIBP was carried out. At the end the solid was washed with hexane and then dried. The chemical characteristics of the solid, the results of the propylene polymerization test are reported in Table 1.

hydrogen or a hydrocarbon radical having 1–12 carbon atoms, which is carried out in the presence of a catalyst comprising a catalyst component comprising the product obtained by contacting a Ti compound of formula $Ti(OR)_{n-y}X_y$, where R is an alkyl, isoalkyl, cycloalkyl or aryl radical having from 1 to 18 carbon atoms, X is a halogen atom, n is the valence of titanium and y is a number of from 1 to n, with a pre-polymer having a porosity (measured with Hg method) higher than 0.3 cc/g and containing from 0.5 to 100 g of polymer per g of a solid catalyst component, said pre-polymer being obtained by (co)polymerizing an olefin or a diolefin which is (co)polymerizable in the presence of a catalyst comprising the solid catalyst component comprising a transition metal compound selected from the group consisting of Ti compounds of the formula $Ti(OR)_{n-y}X_y$, vanadium halides, vanadium haloalcoholates, vanadyl halides, Ti, Zr and Hf compounds containing at least a π-metal bond, said transition metal compound being supported on a Mg dihalide having a mean crystallite size lower than 30 nm.

2. Propylene (co)polymers having a heat of fusion (ΔHf) higher than 70 J/g measured by D.S.C. method, obtained by a process comprising the (co)polymerization of olefins $CH_2$=CHR, wherein R is hydrogen or a hydrocarbon radical having 1–12 carbon atoms, which is carried out in the presence of a catalyst comprising a catalyst component comprising the product obtained by contacting a Ti compound of formula $Ti(OR)_{n-y}X_y$, where R is an alkyl, isoalkyl, cycloalkyl or aryl radical having from 1 to 18 carbon atoms, X is a halogen atom, n is the valence of titanium and y is a number of from 1 to n, with a pre-polymer having a porosity (measured with Hg method) higher than 0.3 cc/g and containing from 0.5 to 100 g of polymer per g of a solid catalyst component, said pre-polymer being obtained by (co) polymerizing an olefin or a diolefin which is (co) polymerizable in the presence of a catalyst comprising the solid catalyst component comprising a transition metal compound selected from the group consisting of Ti compounds of the formula $Ti(OR)_{n-t}X_y$, vanadium halides, vanadium haloalcoholates, vanadyl halides, Ti, Zr and Hf compounds containing at least a π-metal bond, said transition metal

TABLE 1

| | ANALYSIS | | | | PROPYLENE POLYMERIZATION | | | ETHYLENE POLYMERIZATION | |
|---|---|---|---|---|---|---|---|---|---|
| EXAMPLE | Ti (w %) | Mg (w %) | DIBP (w %) | Et. (w %) | Activity [a] | Activity [b] | X.I. | Activity [a] | Activity [b] |
| 1A | 2.1 | 20.1 | 5.8 | — | — | 15.3 | 96.6 | — | 15 |
| 1B | 0.2 | 1.92 | 0.6 | — | 1.04 | 11 | 95.8 | — | — |
| 1 | 0.56 | 2.1 | 0.3 | — | 2.5 | 26.5 | 92 | 2 | 21 |
| 2 | 2.2 | 1.7 | 9 | — | 2.3 | 24 | 95 | 1.9 | 20 |
| 3 | 0.57 | 1.9 | | 1.3 | 3.4(*) | 35(*) | 92(*) | 3.2 | 33.6 |
| | | | | | 2.9(+) | 30.5(+) | 96.6(+) | | |
| 4 | 0.94 | 1.72 | 0.2 | — | 1.7 | 26 | n.d. | 3.9 | 58 |
| 5 | 0.5 | 1.5 | 0.1 | — | 2 | 23.2 | n.d. | 1.9 | 22 |
| 6 | 0.4 | 1.6 | | 1 | 2.6(*) | 30.2(*) | 93.5(*) | — | — |
| | | | | | 2(+) | 24.3(+) | 96.2(+) | | |
| 7 | 0.65 | 0.6 | 0.6 | — | 1 | 30 | 96 | — | — |

Activity [a]: Activity expressed in terms of Kg of polymer per g of pre-polymer fed
Activity [b]: Activity expressed in terms of Kg of polymer per g of cat. comp. contained in the pre-polymer
(*): Polymerization carried out in the absence of external donor
(+): Polymerization carried out with dicyclopentyldimethoxysilane as external donor with a TEAL/donor ratio of 60
Et.: 9,9-bis(methoxymethyl)fluorene
n.d. = not determined

What is claimed is:

1. Olefin polymers obtained by a process comprising the (co)polymerization of olefins $CH_2$=CHR, wherein R is compound being supported on a Mg dihalide having a mean crystallite size lower than 30 nm.

* * * * *

UNITED STATES PATENT AND TRADEMARK OFFICE
CERTIFICATE OF CORRECTION

PATENT NO. : 6,797,794 B2
DATED : September 28, 2004
INVENTOR(S) : Licio Zambon et al.

It is certified that error appears in the above-identified patent and that said Letters Patent is hereby corrected as shown below:

Column 16,
Line 37, change "Ti(OR)$_{n-t}$X$_y$" to -- Ti(OR)$_{n-y}$X$_y$ --

Signed and Sealed this

Twenty-third Day of November, 2004

JON W. DUDAS
*Director of the United States Patent and Trademark Office*